March 31, 1931.  E. G. GARTIN  1,798,666
AUTOMATIC LUBRICATOR
Filed Feb. 21, 1928   2 Sheets-Sheet 2
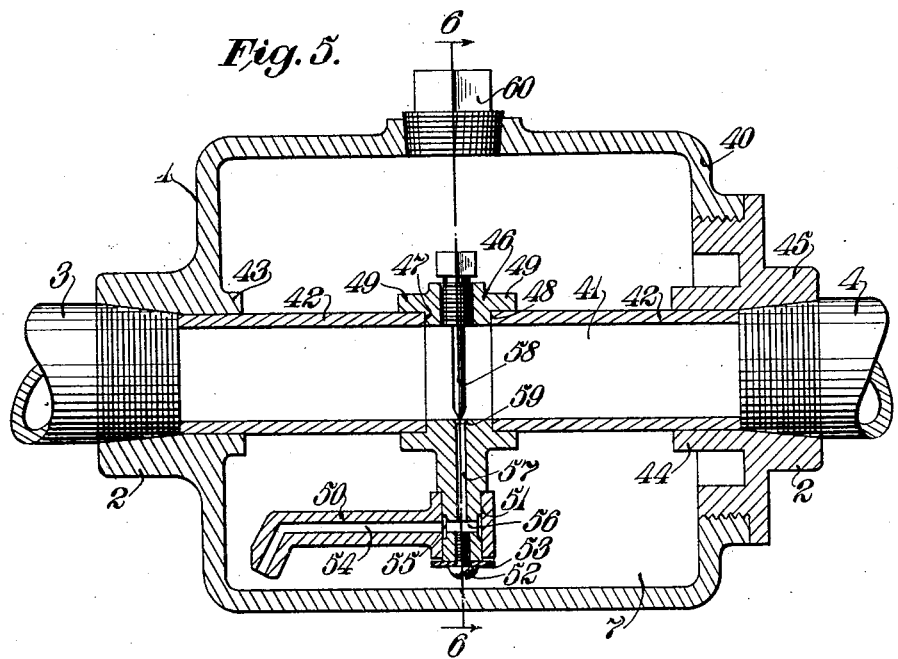
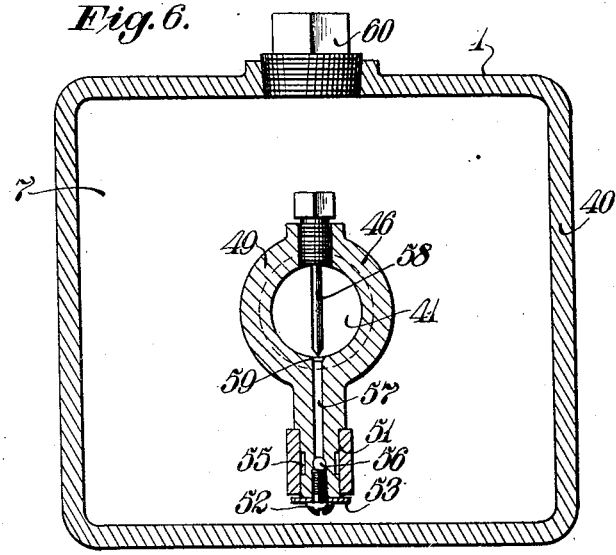
Inventor:
Elmer G. Gartin.
by Louis A. Maxson
Atty.

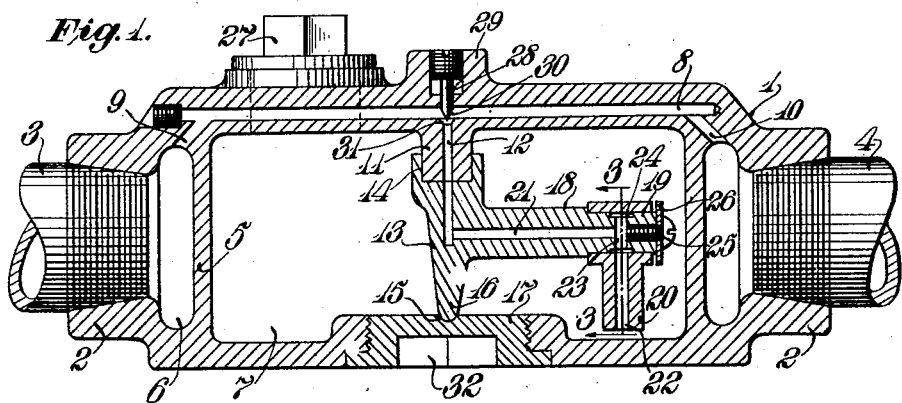

Patented Mar. 31, 1931

1,798,666

UNITED STATES PATENT OFFICE

ELMER G. GARTIN, OF CLAREMONT, NEW HAMPSHIRE, ASSIGNOR TO SULLIVAN MACHINERY COMPANY, A CORPORATION OF MASSACHUSETTS

AUTOMATIC LUBRICATOR

Application filed February 21, 1928. Serial No. 255,986.

My invention relates to automatic lubricators of a type particularly adapted for use in fluid pressure supply lines for rock drilling tools.

It is an object of my invention to provide an improved automatic lubricator of the type specified. It is a further object to provide an improved lubricator adapted to be installed in a pressure fluid supply line and operative to supply oil from a reservoir in response to fluctuations of pressure in the supply line. Another object is to provide in a lubricator of the type specified an improved pivotally mounted device for drawing the lubricant from a reservoir in any position of the lubricator. A more specific object is to provide a plurality of pivotally mounted members disposed in a lubricant reservoir for supplying lubricant to a fluid pressure line. In practice my improved lubricator may take the form of a member pivotally mounted in a lubricant reservoir with a second member mounted to swing about the end of the pivoted member for supplying lubricant from the reservoir to a pressure fluid supply line. Other objects and advantages of the invention will hereinafter more fully appear.

In the accompanying drawings, there are shown for purposes of illustration three forms which my invention may assume in practice.

In these drawings,—

Fig. 1 shows a central vertical section through one form of my improved lubricator.

Fig. 2 is a plan view of the lubricator shown in Fig. 1 with parts broken away to facilitate illustration.

Fig. 3 is a detail sectional view taken on the line 3—3 of Fig. 1.

Fig. 4 is a central longitudinal section through a modified construction of my improved lubricator.

Fig. 5 illustrates a central longitudinal sectional view of still another modification.

Fig. 6 is a vertical section taken on the line 6—6 of Fig. 5.

In the preferred embodiment of my invention illustrated in Figs. 1 to 3, the lubricator takes the form of a generally cylindrical body 1 having a flat bottom surface and suitably threaded connections 2 at opposite ends for connection to a pressure fluid line 3 at one side and to a continuation 4 at the opposite side. Within the body portion 1 is formed a cylindrical web 5 which defines an annular passage 6 between said web and the outer wall of the body portion and a lubricant reservoir 7 on the interior thereof. The annular passage 6 provides adequate means for conducting the greater part of the pressure fluid flowing through the lines 3 and 4. As will be noted in Fig. 1, a passage 8 connects at opposite ends of the reservoir with the annular passage 6 by way of ports 9 and 10. A cylindrical boss 11 projects into the lubricant reservoir and is provided with a bore 12 communicating with passage 8. A member 13 is mounted to swing about a vertical axis in the lubricant reservoir having a bearing 14 upon the cylindrical boss 11 and a second bearing 15, which in this instance takes the form of a spherical surface, at the lower end of a projection 16 integral with the member 13 cooperating with a small concave recess formed in a removable plug 17. The swinging member 13 has an arm 18 extending longitudinally to a point adjacent the periphery of the reservoir and the end of this arm is provided with a bearing portion 19 upon which is mounted a member 20 to swing about the arm 18 on a horizontal axis. The member 13 is provided with a passage 21 which communicates with the bore 12 and passage 8. The swinging arm 20 is provided with a passage 22 which communicates with the passage 21 in arm 18 by means of a transverse passage 23 and an annular groove 24 formed in the bearing portion 19. The swinging member 20 is retained in position on the end of arm 18 by suitable means such as a screw 25 and washer 26. A removable filling cap 27 is provided at the top wall of the reservoir. Means for regulating the flow of lubricant from the reservoir into the passage 8 preferably comprises a valve member 28 threaded into a boss 29 and having a conical end 30 adapted to cooperate with a conical seat 31 at the end of bore 12. The plug 17 may be provided with an internal recess 32 shaped to fit a suitable socket wrench for removal and insertion of the plug. In assembling the parts of my improved lubricator the members 13 and 20 may be attached together and inserted as a unit into the reservoir through the opening which is normally closed by plug 17. The bearing 14 is then fitted over the cylindrical projection 11 and plug 17 screwed home.

In operation the reservoir 7 may be filled with lubricant by removal of plug 27 and while this is being done a stop valve which is ordinarily provided in the pressure fluid supply line leading to the lubricator would be closed so that the lubricator would be relieved of all pressure. After filling of the reservoir and insertion of the plug 27, the pressure may be placed upon the lubricator, whereupon the pressure fluid will flow past the valve 28 through passages 12, 21, 23, and 22 until the reservoir is subjected to line pressure. Now if the operator of a tool to which pressure fluid is being supplied opens the throttle valve of his machine, there will be a flow of pressure fluid through the lines 3 and 4 with a consequent reduction in the pressure at the lubricator which will cause the pressure in the lubricant reservoir to force a quantity of lubricant back through passages 22, 23, 21, 12, and 8 into the pressure fluid line leading to the tool to be lubricated. Also during operation, assuming that the tool to be lubricated is fitted with some form of reciprocating motor, there will be fluctuations in pressure in the supply line which will cause alternate flow of pressure fluid into the reservoir and lubricant from the reservoir, the action resembling a small automatic pump. It will be evident that when the reservoir is tilted to any position whatever the arm 18 will swing under the action of gravity to a position wherein the bearing portion 19 will be at the lowest possible level and of course no matter what the position of the arm 18, the member 20 will swing about the bearing portion 19 until it hangs downwardly. With this construction, even if the lubricator be turned upside down, as it is liable to be in actual practice, it will continue to function and draw oil from the reservoir until the supply is practically exhausted.

In the modified form of construction shown in Fig. 4, instead of providing two swinging members one of which is pivoted upon the other, I have provided a single swinging member 13a having an arm 33 projecting horizontally adjacent the lower bearing 15, which arm may be provided with a weighted, downwardly projecting portion 34. A passage 35 leads to the extreme lower and outermost portion of the swinging member. Instead of forming the boss 11 integral with the body portion 1, it is illustrated in this modification as comprising a part of a removable plug 36 which is provided with screw threads 37 for attachment to the upper wall of the body portion. The valve 28 of course is mounted in this removable plug instead of the external boss 29 as in the preferred form. The plug is provided with a transverse passage 38 which is in constant communication by way of a groove 39 with the passage 8. This feature will facilitate assembling of the pivoted member in the reservoir.

The operation of this form of the device will be practically the same as that discussed in connection with the description of the first form except that it will not operate when the lubricator is completely inverted. However, it will be apparent that for all ordinary conditions, as long as the lubricator is kept on its bottom surface, all of the lubricant may be withdrawn, even if the device is tilted to an extreme limit in any direction.

In the form of my invention shown in Figs. 5 and 6 the general construction is somewhat modified as will be readily apparent in the drawings. The body portion 40 is of somewhat more compact form than the flat cylindrical type and the pressure fluid is conducted through a central passageway 41 directly from the connection 3 on one side to the pipe 4 on the opposite side. In order to provide the passageway 41 a pair of tubular members 42 are mounted in suitable bosses, one of which is designated 43 and the other 44, the latter being part of a removable closure member 45. Mounted between the adjacent ends of the tubular members 42 is a member 46 which has shoulders 47 and 48 abutting against the ends of the tubular members and laterally extending annular flanges 49 which provide a suitable bearing upon the tubular members so that member 46 may swing freely about a horizontal axis. Upon the lower end of this member is mounted a member 50 which is fixed upon a bearing portion 51 by means of a screw 52 and washer 53. This member has a bore 54 which is in communication with the passageway 41 by means of a groove 55 in the bearing portion, a transverse passage 56 and a longitudinal passage 57. The flow of lubricant from the reservoir into the air line may be controlled by a valve element 58 adjustably mounted in the member 46 and cooperating with a conical seat 59 at the end of passage 57. A filling plug 60 is also shown and it will be noted that the position of this plug is such that when it is removed the valve element may be adjusted by means of a suitable socket wrench.

The action of this device is similar to the action of the other two forms which have been described. Whenever the lubricator is tilted in any direction away from the position shown, the member 46 will swing so that its depending portion will assume the lowest possible level and member 50 will swing about its bearing upon the end of member 46 until its end is in the lowest point of the reservoir. It will thus be clear that no matter in what position the body of the lubricator may be in actual use, practically all of the oil may be drawn from the reservoir.

In assembling this device the closure member 45 is removed and tube 42 placed in position. If desired this tube may be securely fixed in the boss 43. The swinging members 46 and 50 may then be assembled in desired relation and the valve element also associated therewith and the whole placed into the reservoir and fitted over the end of tube 42. The other tube may then be securely attached to the closure member 45 and inserted and the closure member screwed into position. The pressure fluid line may be then connected.

As a result of my invention it will be evident that an improved lubricator of simple construction has been devised which will automatically function to supply lubricant at the desired time into a pressure fluid supply line and that this lubricator by reason of the peculiar construction of the pivoted members will permit substantially all of the lubricant being withdrawn no matter what position the device may assume in actual use.

While I have in this application specifically described three forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In an automatic lubricator adapted to be installed in a pressure fluid supply line, a casing having an annular fluid conducting passage formed therein, a lubricant reservoir in said casing within said passage, a supplemental fluid conducting passage communicating with said annular passage, means for supplying lubricant from said reservoir to said annular passage through said supplemental passage, said means comprising passage forming means pivotally mounted in said reservoir and automatically movable so as to communicate with the lowest point in said reservoir.

2. In an automatic lubricator, a casing having a passage formed therein adapted to conduct pressure fluid therethrough, a reservoir in said casing, means for establishing communication between said reservoir and said passage comprising a member mounted in said reservoir for free pivotal movement 360 degrees about its axis and having a passage in communication with said fluid conducting passage, and a second member mounted on said first mentioned member to swing 360 degrees about an axis at right angles to the axis of said first mentioned member and having a passage therethrough in constant communication with the passage through said first mentioned member.

3. In an automatic lubricator, a casing having walls defining a central lubricant reservoir, a pressure fluid conducting passage formed in said walls, means for establishing communication between said reservoir and said passage to feed lubricant into said passage including a member having a lubricant conducting passage therethrough in communication with said fluid conducting passage, and means carried by the top and bottom walls of said casing providing a pivotal bearing for said member permitting free swinging movement thereof to allow communication between said fluid conducting passage and the lowest point in said reservoir.

4. In an automatic lubricator adapted to be installed in a pressure fluid line, a casing having walls defining a lubricant reservoir, an annular passage in said walls around said reservoir for conducting pressure fluid therethrough, and means for establishing communication between said reservoir and said fluid conducting passage including a member pivoted on an axis arranged centrally of said lubricant reservoir and having a passage therethrough in communication with the fluid conducting passage in the walls of said reservoir.

5. In an automatic lubricator adapted to be installed in a pressure fluid supply line, a casing having means for conducting pressure fluid therethrough, said casing having an exterior flat bottom surface on which it is adapted to rest during use, a lubricant reservoir in said casing, and means for supplying lubricant from said reservoir to said conducting means including a lubricant conducting member pivotally supported on the bottom wall of said casing and arranged to swing about an axis substantially perpendicular to said flat surface.

6. In an automatic lubricator adapted to be installed in a pressure fluid supply line, a casing having means for conducting pressure fluid therethrough, said casing having an exterior flat bottom surface on which it is adapted to rest during use, a lubricant reservoir in said casing, and means for supplying lubricant from said reservoir to said conducting means including a lubricant conducting member pivotally supported on one wall of said casing and arranged to swing about an axis substantially perpendicular to said flat surface.

7. In an automatic lubricator adapted to be installed in a pressure fluid supply line, a casing having means for conducting pressure fluid therethrough, said casing having an exterior flat bottom surface on which it is adapted to rest during use, a lubricant reservoir in said casing, a boss rising from the bottom wall of said casing, and means for supplying lubricant from said reservoir to said conducting means including lubricant conducting means pivotally supported on said boss to swing about an axis substantially perpendicular to said flat surface, the terminal end of said lubricant conducting means being arranged closely adjacent the bottom wall of said casing.

8. In an automatic lubricator adapted to be installed in a pressure fluid supply line, a casing having an exterior flat bottom surface on which it is adapted to rest during use, means integral with said casing providing a passage therethrough for conducting pressure fluid, a lubricant reservoir in said casing, and means for supplying lubricant from said reservoir to said passage including a lubricant conducting member pivotally supported on the bottom wall of said casing and arranged to swing about an axis substantially perpendicular to said bottom surface.

9. In an automatic lubricator adapted to be installed in a pressure fluid supply line, a casing having an exterior flat bottom surface on which it is adapted to rest during use, means integral with said casing providing a passage therethrough for conducting pressure fluid, a lubricant reservoir in said casing, means for supplying lubricant from said reservoir to said passage including a lubricant conducting member pivotally supported on the bottom wall of said casing and arranged to swing about an axis perpendicular to said bottom surface, and a valve for controlling flow of lubricant to said passage.

10. In an automatic lubricator adapted to be installed in a pressure fluid supply line, a casing having means for conducting line pressure fluid therethrough, a lubricant reservoir in said casing, means disposed within said reservoir for conducting lubricant from said reservoir to said casing conduit including means having an L-shaped lubricant passage one leg of which communicates with said line pressure conduit in the casing, and means whereby the other leg of said lubricant passage is adapted to swing through at least 180 degrees about the axis of said first mentioned leg.

11. The combination set forth in claim 10 further characterized by the provision of a member having a lubricant passage communicating with, and swiveled about the axis of, said swinging passage.

12. In an automatic lubricator adapted to be installed in a pressure fluid supply line, a casing having means for conducting line pressure fluid therethrough, a lubricant reservoir in said casing, means disposed within said reservoir for conducting lubricant from said reservoir to said casing conduit including means having an L-shaped lubricant passage one leg of which communicates with said line pressure conduit in the casing, and means whereby the other leg of said lubricant passage is adapted to swing through a complete revolution about an axis angularly disposed to the axis of said second leg.

13. The combination set forth in claim 12 further characterized by the provision of a member having a lubricant passage communicating with said swinging passage and adapted to be rotatable through a complete revolution about the axis of the swinging passage.

14. In an automatic lubricator adapted to be installed in a pressure fluid line, a casing having a lubricant reservoir therein, means forming a passage adapted to conduct line pressure fluid through said casing, a boss projecting inwardly of said reservoir from one wall thereof and having a lubricant passage communicating with the line conduit in the casing, a member pivotally supported on said boss and having a lubricant passage communicating with said boss passage, said boss and pivotal member being arranged whereby removal of said member is in a direction axially of said boss.

15. In an automatic lubricator adapted to be installed in a pressure fluid line, a casing having a passage for conducting line pressure fluid therethrough and also having a lubricant reservoir, and means forming a lubricant passage leading from said reservoir to said line conduit in the casing including a plurality of cooperating elements each having a lubricant passage in communication with that in the other and each being adapted to have swiveled movement through at least 180 degrees, one of said elements swiveling with respect to another.

16. The combination set forth in claim 15 further characterized in that each of said elements is adapted to have swiveled movement through a full revolution.

In testimony whereof I affix my signature.

ELMER G. GARTIN.